United States Patent
Da Jornada et al.

(10) Patent No.: US 12,224,969 B2
(45) Date of Patent: Feb. 11, 2025

(54) MACHINE LEARNING-BASED PREDICTION OF MESSAGE RESPONSES USING A CORPUS OF RESPONSE TEMPLATES

(71) Applicant: Dell Products L.P., Round Rock, TX (US)

(72) Inventors: João Francisco Homrich Da Jornada, Porto Alegre (BR); Walter Cristian Bruck Mundstock, Porto Alegre (BR); Daniel Carvalho Liedke, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 17/743,553

(22) Filed: May 13, 2022

(65) Prior Publication Data

US 2023/0370393 A1    Nov. 16, 2023

(51) Int. Cl.
*H04L 51/02* (2022.01)
*G06F 18/21* (2023.01)
*G06N 20/00* (2019.01)
*G06Q 30/016* (2023.01)

(52) U.S. Cl.
CPC .......... *H04L 51/02* (2013.01); *G06F 18/2178* (2023.01); *G06Q 30/016* (2013.01); *G06N 20/00* (2019.01)

(58) Field of Classification Search
CPC ...... H04L 51/02; G06Q 30/016; G06N 20/00; G06F 18/2178
See application file for complete search history.

(56) References Cited

U.S. PATENT DOCUMENTS

| | | | |
|---|---|---|---|
| 11,516,157 B1 | 11/2022 | Jornada et al. | |
| 2017/0223190 A1* | 8/2017 | Mandel | G06Q 30/016 |
| 2019/0180288 A1 | 6/2019 | Shaev et al. | |
| 2020/0019609 A1 | 1/2020 | Yu et al. | |
| 2020/0374258 A1* | 11/2020 | Fox | G06Q 50/01 |

(Continued)

OTHER PUBLICATIONS

"Real-Time Agent Assistance, at the Right Time"; https://www.asapp.com/products/ai-services/autoassist/; downloaded Jul. 10, 2023.

(Continued)

*Primary Examiner* — Thomas J Dailey
(74) *Attorney, Agent, or Firm* — Ryan, Mason & Lewis, LLP

(57) ABSTRACT

Techniques are provided for machine learning-based prediction of message responses using a corpus of response templates. One method comprises obtaining a user message sent by a user; applying the user message to a machine learning model that predicts a response template, from a corpus of response templates, that is responsive to the user message, wherein the machine learning model is trained using training data comprising historical user messages sent by multiple users and agent messages sent by customer service agents, wherein the agent messages: (i) have a similarity score with respect to at least one of the response templates that satisfies one or more similarity criteria, and (ii) are sent in response to a corresponding historical user message; and automatically generating a response to the user message using the predicted response template.

20 Claims, 7 Drawing Sheets

(56) References Cited

U.S. PATENT DOCUMENTS

2022/0310085 A1* 9/2022 Patil ...................... G06N 20/00

OTHER PUBLICATIONS

"Automate Away 70% of Agent Responses"; https://www.asapp.com/products/ai-services/autocompose/; downloaded Jul. 10, 2023.
"Automate Call Summaries for 100% of your Customer Interactions"; https://www.asapp.com/products/ai-services/autosummary/; downloaded Jul. 10, 2023.
"Transcribe Every Call with the World's Most Accurate Speech-to-Text Technology"; https://www.asapp.com/products/ai-services/autotranscribe/; downloaded Jul. 10, 2023.
Pujari, Rakshit; "Training Your Own Message Suggestions Model Using Deep Learning", Apr. 16, 2021; https://towardsdatascience.com/training-your-own-message-suggestions-model-using-deep-learning-3609c0057ba8; downloaded on May 10, 2022.
"Predict Sentiment in Customer Service Chats"; udated Dec. 1, 2021; https://pathfinder.datarobot.com/use-case/predict-sentiment-in-customer-service-chats?tab=overview; downloaded on May 10, 2022.
"Use suggested replies to respond to messages without typing"; https://support.microsoft.com/en-us/office/use-suggested-replies-to-respond-to-messages-without-typing-010c54e1-a613-4771-94ed-76d7fb77cba5; downloaded on May 10, 2022.

* cited by examiner

DATA PREPARATION AND MODEL TRAINING PROCESS

1. OBTAIN HISTORICAL CHAT SESSIONS IN A TEXT FORMAT;
2. OBTAIN DEFINED RESPONSE TEMPLATES FROM THE CORPUS OF RESPONSE TEMPLATES;
3. REMOVE PERSONALLY IDENTIFIABLE INFORMATION FROM HISTORICAL CHAT SESSIONS;
4. PARSE HISTORICAL CHAT SESSIONS TO SEPARATE AGENT MESSAGES AND USER MESSAGES;
5. IDENTIFY TOP N MOST FREQUENTLY USED AGENT MESSAGES;
6. FOR EACH MOST FREQUENTLY USED AGENT MESSAGE, IDENTIFY AGENT MESSAGES SIMILAR TO A DEFINED RESPONSE TEMPLATE BASED ON SIMILARITY SCORE;
7. GENERATE MODEL TRAINING DATA COMPRISING EACH AGENT MESSAGE HAVING A SIMILARITY SCORE THAT SATISFIES ONE OR MORE SIMILARITY CRITERIA, WHERE, FOR EACH GIVEN AGENT MESSAGE HAVING A SIMILARITY SCORE THAT SATISFIES THE SIMILARITY CRITERIA, AN IDENTIFIER OF THE CORRESPONDING SIMILAR DEFINED RESPONSE TEMPLATE IS USED AS A TRAINING CLASSIFICATION LABEL AND THE FEATURES COMPRISE AT LEAST ONE USER MESSAGE PRECEDING THE GIVEN AGENT MESSAGE;
8. TRAIN THE MACHINE LEARNING MODEL TO PREDICT ONE OR MORE DEFINED RESPONSE TEMPLATES USING THE MODEL TRAINING DATA;
9. TEST AN ACCURACY OF THE TRAINED MACHINE LEARNING MODEL FOR A VARIABLE NUMBER OF RECOMMENDED AGENT RESPONSES TO DETERMINE A NUMBER OF RECOMMENDED AGENT RESPONSES TO EMPLOY THAT BALANCES MODEL ACCURACY AND RESPONSE SELECTION EFFICIENCY

FIG. 3

| RESPONSE TEMPLATE NAME | NUMBER OF OCCURRENCES |
|---|---|
| END-OF-CHAT SURVEY | 5225 |
| ADDITIONAL ASSISTANCE? | 4480 |
| HAPPY TO ASSIST YOU | 4470 |
| THANK YOU FOR VERIFYING | 3350 |
| PLEASE VERIFY CHANGES | 2154 |
| PLEASE ALLOW A MOMENT | 1418 |
| ... | ... |
| THANK YOU FOR WAITING | 594 |
| PLEASE HOLD | 466 |
| APPRECIATE PATIENCE | 105 |
| REQUESTED CHANGES COMPLETED | 64 |

FIG. 4

MACHINE LEARNING-BASED PREDICTION OF MESSAGE RESPONSES USING A CORPUS OF RESPONSE TEMPLATES

FIELD

The field relates generally to information processing systems and more particularly, to the processing of messages using such information processing systems.

BACKGROUND

Despite the increased use of automated chat agents by numerous customer service organizations, human agents are still needed for a number of interactions, such as for interactions involving more complex topics and for highly valued customers. A number of customer service organizations provide human agents with access to messages templates that are often based on frequently used messages. Nonetheless, it is often difficult for a human agent to compose a message when responding to a customer.

SUMMARY

In one embodiment, a method comprises obtaining at least one user message sent by at least one user; applying the at least one user message of the at least one user to at least one machine learning model that predicts one or more response templates, from a corpus of response templates, that are responsive to the at least one user message, wherein the at least one machine learning model is trained using training data comprising at least one historical user message sent by one or more users and at least one agent message sent by at least one customer service agent, wherein the at least one agent message: (i) has a similarity score with respect to at least one of the response templates, from the corpus of response templates, that satisfies one or more similarity criteria, and (ii) is sent in response to the at least one historical user message sent by the one or more users; and automatically generating at least one response to the at least one user message using the predicted one or more response templates.

In some embodiments, the at least one machine learning model predicts a plurality of the response templates that are responsive to the at least one user message and wherein the plurality of response templates are sorted using a corresponding confidence score associated with the prediction of each of the plurality of the response templates. At least a subset of the plurality of the response templates that are responsive to the at least one user message can be presented to the at least one customer service agent, using a graphical user interface, for a selection by the at least one customer service agent to prepare at least one response to the at least one user message. The corresponding confidence score may be determined within a context of a larger communication comprising the at least one user message.

In one or more embodiments, the at least one machine learning model is trained to correlate the one or more response templates from the corpus of response templates with a content of the at least one historical user message sent by the one or more users prior to a sending of the corresponding at least one agent message.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for a data preparation and model training process in accordance with an illustrative embodiment;

FIG. 4 is a sample table illustrating a response template database in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for machine learning-based prediction of message responses using a corpus of response templates.

In one or more embodiments of the disclosure, a machine learning model is employed to predict a response for one or more user messages (or a group of messages from a user). An assisted message response approach is provided that obtains one or more user messages sent by a user, applies the obtained messages to the machine learning model that predicts one or more responses, from a corpus of response templates (sometimes referred to as template responses or "quick texts"), to the one or more user messages, and generates a proposed response, for example, based on the top scoring response templates. In this manner, the human agent may select a response from the top scoring response templates so that the typing of a full response is not needed.

The disclosed machine learning-based response prediction techniques, in some embodiments, leverage (i) data preparation, (ii) machine learning model training using the corpus of response templates and (iii) response prediction.

As noted above, a number of customer service organizations provide message templates comprising responses that are frequently used by human agents. It remains difficult, however, for the human agent to efficiently select an appropriate message template when responding to a customer. For example, the number of available message templates can quickly grow to an unwieldy number. Thus, the time required for a human agent to lookup an appropriate predefined message template may be time consuming and may impair further productivity gains. In addition, the human agent often needs to further edit a selected message template with information that is specific to a particular user interaction.

One or more aspects of the disclosure recognize that while automated chat agents require a high confidence level of the classifications generated by a machine learning model, the disclosed machine learning-based response prediction techniques are more resilient in at least some embodiments, given that human interactions (e.g., selection from a set of top scoring response templates) are integrated in the assisted message response process.

Figure 1:
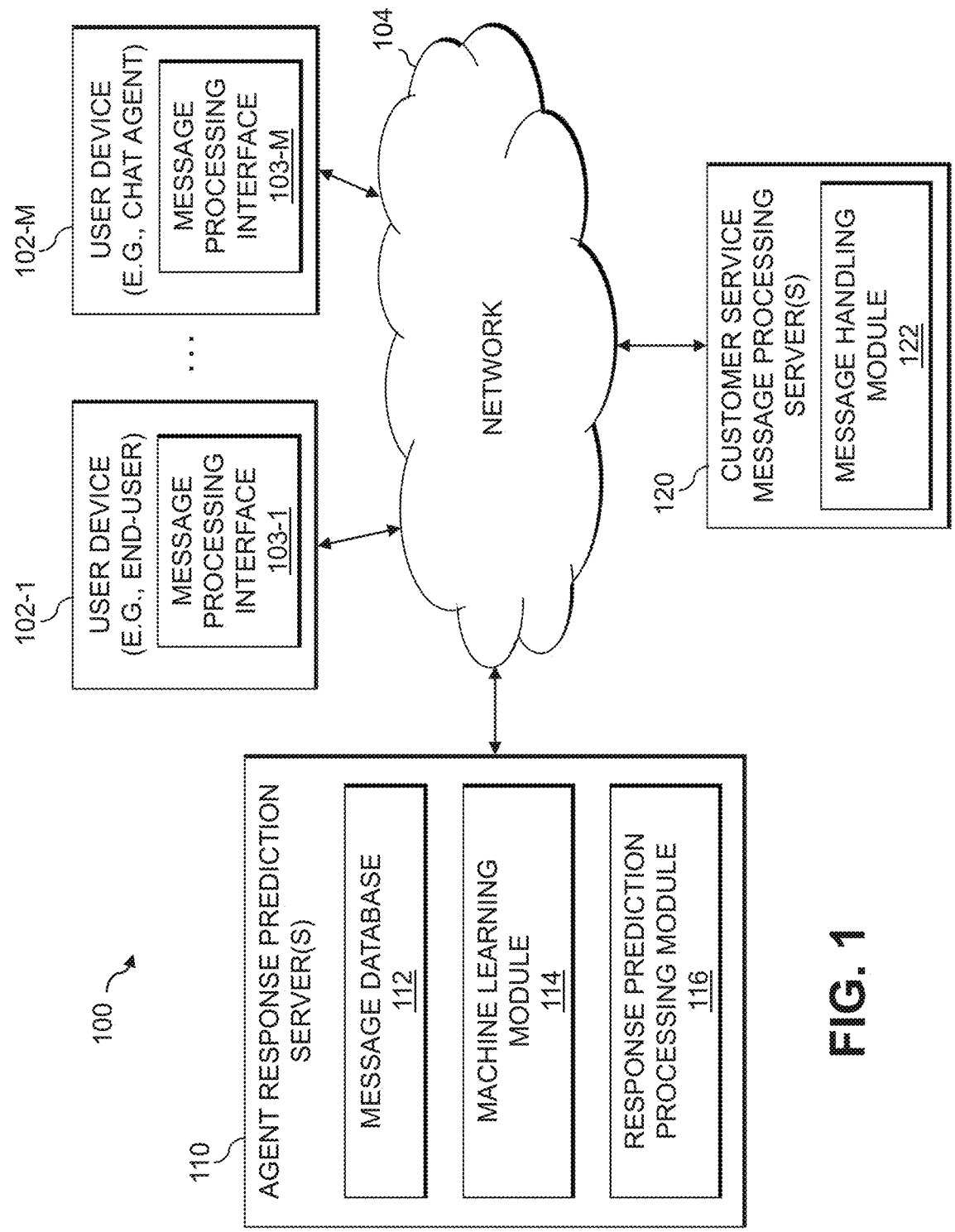
FIG. 1 illustrates an information processing system configured for machine learning-based prediction of message responses using a corpus of response templates in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 are one or more agent response prediction servers 110 and one or more customer service message processing servers 120.

The user devices 102 may be employed by end-users (e.g., customers) and/or customer service or other chat agents, as discussed further below, and may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The user devices 102 in the example of FIG. 1 comprise corresponding message processing interfaces 103-1 through 103-M (collectively, referred to herein as message processing interfaces 103), discussed further below.

Also, it is to be appreciated that the term "user" in this context and elsewhere herein is intended to be broadly construed so as to encompass, for example, human, hardware, software or firmware entities, as well as various combinations of such entities.

Also associated with the user devices 102 are one or more input-output devices, which illustratively comprise keyboards, displays or other types of input-output devices in any combination. Such input-output devices can be used, for example, to support one or more user interfaces to the user devices 102, as well as to support communication between the customer service message processing servers 120 and/or other related systems and devices not explicitly shown.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The agent response prediction servers 110 and the customer service message processing servers 120 in the FIG. 1 embodiment are assumed to be implemented using at least one processing device. Each such processing device generally comprises at least one processor and an associated memory, and implements one or more functional modules for controlling certain features of the agent response prediction servers 110 and/or the customer service message processing servers 120.

More particularly, the agent response prediction servers 110 and the customer service message processing servers 120 in this embodiment can each comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow for communication between the agent response prediction servers 110, the customer service message processing servers 120 and/or the user devices 102 over the network 104, and each illustratively comprises one or more conventional transceivers.

In the example of FIG. 1, the agent response prediction server 110 may comprise a message database 112, a machine learning module 114 and a response prediction processing module 116. Generally, the message database 112 may be configured to store data pertaining to, for example, chat sessions (e.g., historical messages and statistics) and response templates (e.g., the response template database discussed further below in conjunction with FIG. 4). The machine learning module 114 employs the disclosed machine learning-based response prediction techniques, as discussed further below in conjunction with FIG. 2, to process one or more user messages and to generate one or more predicted responses to be utilized by the customer service agent. The response prediction processing module 116 processes the predictions generated by the machine learning module 114 to present the customer service agent with one or more response templates to be utilized by the customer service agent to prepare a response to one or more user messages.

In the example of FIG. 1, the representative customer service message processing server 120 may be implemented, for example, at least in part, using the messaging platform provided by Salesforce.com, Inc., as modified herein to provide the disclosed features and functions for machine learning-based response prediction. The customer service message processing servers 120 may comprise a message handling module 122 that comprises server-side functionality, for example, using an application programming interface, that interacts with the message processing interfaces 103 of the user devices 102 and the agent response prediction server 110, such as intercepting messages between end-users and customer service agents before such intercepted messages are displayed to the respective end-users and customer service agents and to provide such intercepted messages to the agent response prediction server 110 to implement the disclosed machine learning-based response prediction functionality. In addition, the message handling module 122 comprises functionality to present the predicted responses to the customer service agent, optionally with corresponding confidence scores, for the customer service agent to select and possibly modify one response for transmission to the end-user (e.g., a customer).

It is to be appreciated that the particular arrangement of elements 112-116 illustrated in the representative agent response prediction server 110 and the element 122 illustrated in the representative customer service message processing server 120 of the FIG. 1 embodiment is presented by way of example only, and alternative arrangements can be used in other embodiments. For example, the functionality associated with the elements 112-116 and element 122 in other embodiments can be combined into a single element, or separated across a larger number of elements. As another example, multiple distinct processors can be used to implement different ones of the elements 112-116 and/or element 122, or portions thereof.

At least portions of elements 112-116 and/or element 122 may be implemented at least in part in the form of software that is stored in memory and executed by a processor.

The agent response prediction servers 110 and/or the customer service message processing servers 120 can have at least one associated database, such as the message database 112 of the agent response prediction server 110, configured to store data pertaining to, for example, customer information, message interaction histories and order histories.

The databases associated with the agent response prediction servers 110 and/or the customer service message processing servers 120 can be implemented using one or more corresponding storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

It is to be understood that the particular set of elements shown in FIG. 1 for machine learning-based prediction of message responses using a corpus of response templates is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the customer service message processing servers 120 and at least one associated database can be on and/or part of the same processing platform.

An exemplary process utilizing elements 112-116 of the agent response prediction server 110 and element 122 of the customer service message processing server 120 in computer network 100 will be described in more detail with reference to, for example, FIGS. 2 through 5.

Figure 2:
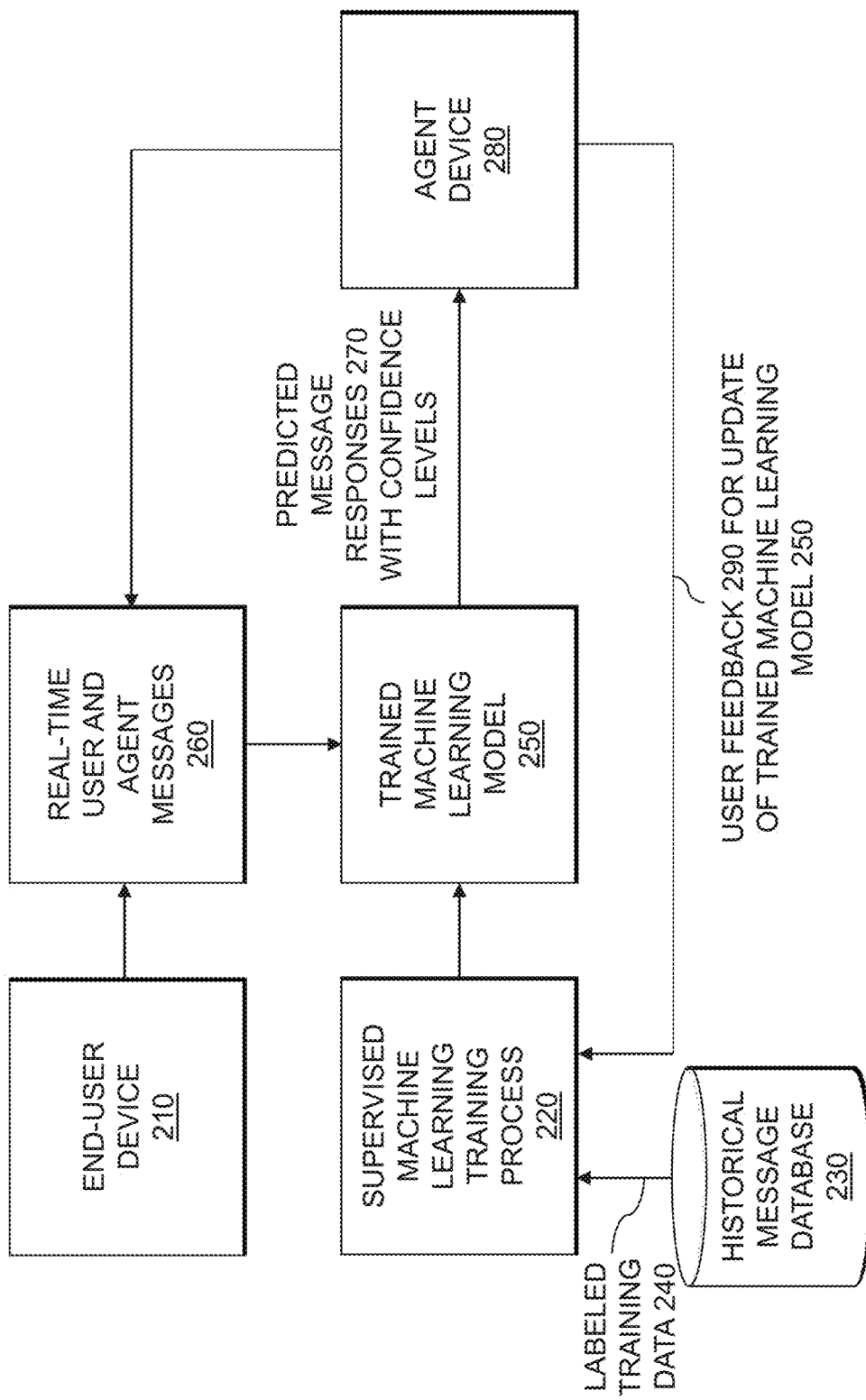
FIG. 2 illustrates a training of a machine learning model and the use of the trained machine learning model to perform response prediction, in accordance with an illustrative embodiment.

FIG. 2 illustrates a training of a machine learning model and the use of the trained machine learning model to perform response prediction in accordance with an illustrative embodiment. In the example of FIG. 2, labeled training data 240, from a historical message database 230, is applied to a supervised machine learning training process 220 in a training phase. A data preparation and model training process is discussed further below in conjunction with FIG. 3 that processes historical chat sessions from the historical message database 230 to generate the labeled training data 240. In addition, the data preparation and model training process of FIG. 3 further describes the use of the labeled training data 240 by the supervised machine learning training process 220 to generate a trained machine learning model 250. In some embodiments, the machine learning model is trained to correlate one or more response templates from a corpus of response templates with a content of user messages from the historical message database 230 that were sent by users prior to at least one agent message, sent by a customer service agent, that was based at least in part on a response template.

In a prediction phase, the trained machine learning model 250 processes real-time user and agent messages 260 from an end-user device 210 and an agent device 280, respectively, to generate one or more predicted message responses 270 with corresponding confidence levels. In some embodiments, at least a subset of the predicted message responses 270 are presented to the customer service agent on the agent device 280 ranked by the corresponding confidence level, so that the customer service agent can generate a response using at least one selected predicted message response 270. The predicted message responses 270 that are presented to the customer service agent on the agent device 280 may have one or more user-specific placeholders that are populated with, for example, the corresponding user information (e.g., name and/or address) and/or order (or case) information.

In some embodiments, user feedback 290 from the agent device 280 may be employed in a feedback manner by the supervised machine learning training process 220 to update the trained machine learning model 250. For example, the user feedback 290 may comprise implicit feedback derived from an acceptance by a customer service agent of one or more predicted message responses 270 (e.g., by selecting one or more of the recommended alternative responses when composing a response), or based on how often a customer service agent accepts at least one recommended alternative response. The user feedback 290 may be employed, for example, to determine when and/or how to retrain the trained machine learning model 250.

FIG. 3 illustrates exemplary pseudo code 300 for a data preparation and model training process in accordance with an illustrative embodiment. In the example of FIG. 3, the data preparation and model training process initially groups historical chat sessions and identifies when such historical chat sessions correlate with a response template from the corpus of response templates. One or more aspects of the disclosure recognize that even when a customer service organization defines a corpus of response templates, there are still numerous ways for a customer service agent to deliver substantially the same content. Thus, the free text portions of the historical chat sessions are processed using natural language processing techniques, such as a universal sentence encoder to group sentences that were generated by customer service agents and to correlate them, by meaning, with a corresponding response template based on similarity score. For example, customer service agent messages that are within a predefined similarity (e.g., over a specific configurable similarity threshold, such as a similarity score of 0.9 or more) of a given defined response template can be determined to be correlated with the given response template.

In addition, the mapping of agent messages to corresponding response templates from the corpus of response templates can be employed during the training of a machine learning model. In some embodiments, the text of historical agent messages that have been correlated with a corresponding response template can be used as features in the training process, along with the corresponding text of one or more user messages that preceded the correlated historical agent messages. In addition, an identifier of the response template that has been identified as correlating with the historical agent messages may be used as a label for the supervised learning that generates the trained machine learning model 250.

In the example of FIG. 3, the data preparation and model training process obtains historical chat sessions in a text format in step 1, and defined response templates from the corpus of response templates in step 2. In step 3, personally identifiable information may be removed from the historical chat sessions. The historical chat sessions are parsed in step 4 to separate agent messages from the user messages.

In step 5, the data preparation and model training process identifies the top N most frequently used agent messages from the historical chat sessions (where N is a configurable number, for example). For each of the N most frequently used agent messages, agent messages are identified in step 6 that are similar to a defined response template based on the assigned similarity score (e.g., by comparing the assigned similarity score to a threshold). As noted above, a universal sentence encoder may encode the text of at least portions of the historical chat sessions into high dimensional vectors that can be used, for example, to determine semantic similarity and other natural language tasks. A pretrained universal sentence encoder is publicly available, for example, in the tensorflow hub.

In step 7, the model training data is generated comprising each agent message having a similarity score that satisfies one or more similarity criteria, where, for each given agent message having a corresponding similarity score that satisfies the similarity criteria, an identifier of the corresponding similar defined response template is used as a training classification label and the training features may further comprise at least one user message preceding the given agent message. The machine learning model is trained in step 8 using supervised learning techniques to predict one or more defined response templates using the model training data generated in step 7. The training may employ the ml.net model builder from Microsoft Corporation.

An accuracy of the trained machine learning model may be tested in step 9 for a variable number of recommended agent responses to determine a number of recommended agent responses to present to a customer service agent in a user interface that balances model accuracy and response selection efficiency.

FIG. 4 is a sample table 400 illustrating a response template database in accordance with an illustrative embodiment. In the example of FIG. 4, the response template database comprises a response template name as an identifier of each defined response template, and a corresponding indication of the number of occurrences of each response template (or a substantially similar message from a customer service agent based at least in part on the corresponding defined response template). Thus, for a given response template, the number of occurrences of the given response template comprises instances of the given response template itself, as well as any customer service agent messages that satisfy the similarity criteria with respect to the given response template. One or more aspects of the disclosure thus recognize that even when a customer service organization defines a corpus of defined response templates, there are still numerous ways for a customer service agent to deliver substantially the same content.

For example, consider the response template of "additional assistance?" in the second row of the table 400, which may be formally defined, for example, as a message comprising "is there anything else that I can help you with today?". Customer service agents may alternatively express this content in a similar manner by stating, for example (among many other possibilities):

"is there anything else I might help with;"

"is there anything else that I can currently assist you with;" and/or

"is there anything else that I can do for you today."

In one or more embodiments of the disclosure, the training process of FIG. 3 will correlate all of the variations of a defined response template, where such variations satisfy the one or more similarity criteria with respect to the defined response template, such that the similar variations are considered together with the defined response template during the model training process.

Figure 5:
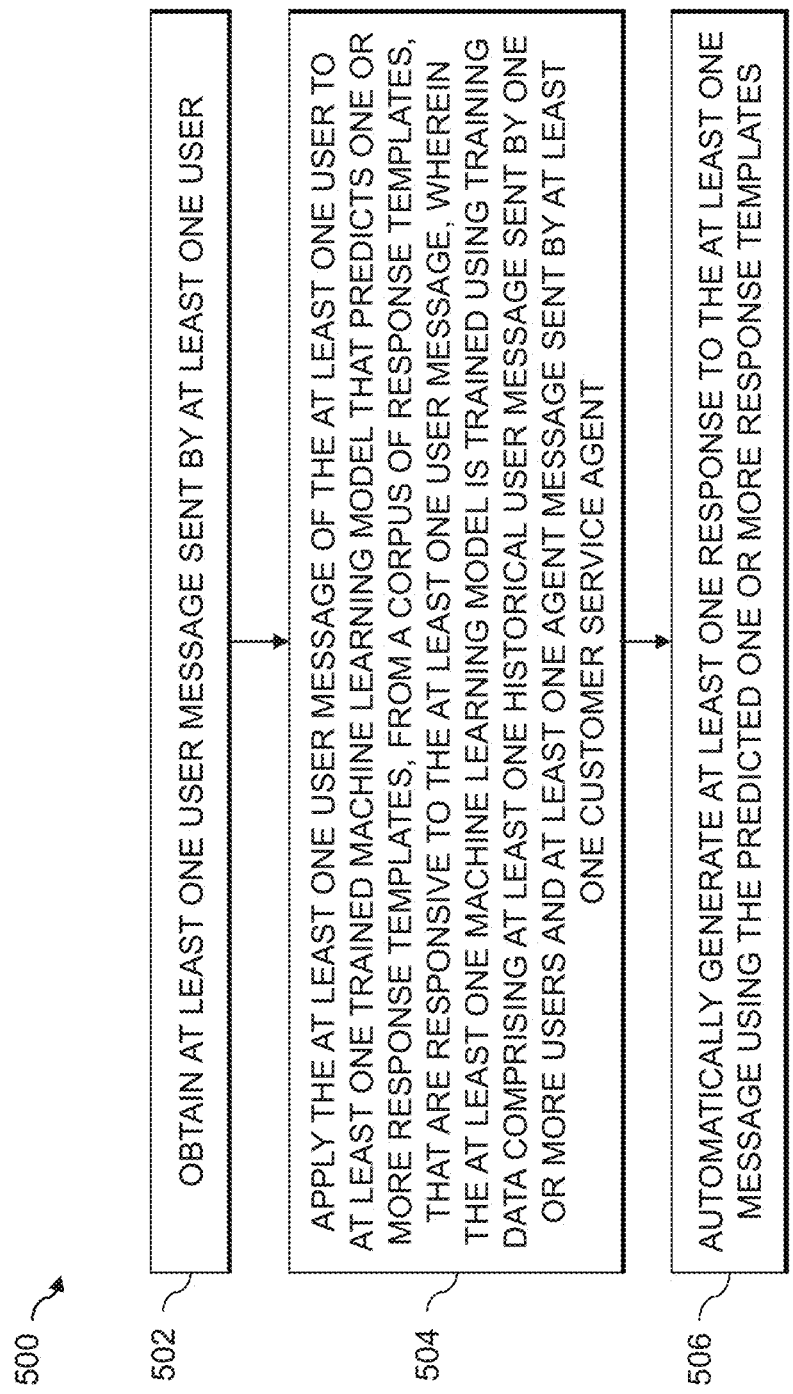
FIG. 5 is a flow diagram illustrating an exemplary process for machine learning-based prediction of message responses using a corpus of response templates in accordance with an illustrative embodiment.

FIG. 5 is a flow diagram illustrating an exemplary process 500 for machine learning-based prediction of message responses using a corpus of response templates in accordance with an illustrative embodiment. In the example of FIG. 5, the process 500 initially obtains at least one user message sent by at least one user in step 502. The at least one user message of the at least one user is applied in step 504 to at least one machine learning model that predicts one or more response templates, from a corpus of response templates, that are responsive to the at least one user message, wherein the at least one machine learning model is trained using training data comprising at least one historical user message sent by one or more users and at least one agent message sent by at least one customer service agent. In at least some embodiments, the at least one agent message: (i) has a similarity score with respect to at least one of the response templates, from the corpus of response templates, that satisfies one or more similarity criteria, and (ii) is sent in response to the at least one historical user message sent by the one or more users.

In step 506, the process 500 automatically generates at least one response to the at least one user message using the predicted one or more response templates.

In some embodiments, the at least one machine learning model predicts a plurality of the response templates that are responsive to the at least one user message and wherein the plurality of response templates are sorted using a corresponding confidence score associated with the prediction of each of the plurality of the response templates. At least a subset of the plurality of the response templates that are responsive to the at least one user message can be presented to the at least one customer service agent, using a graphical user interface, for a selection by the at least one customer service agent to prepare at least one response to the at least one user message. The number of the plurality of response templates that are presented to the at least one customer service agent may be selected based at least in part on an accuracy of the trained machine learning model determined during a testing phase of the at least one machine learning model. The corresponding confidence score may be determined within a context of a larger communication comprising the at least one user message.

In one or more embodiments, the at least one machine learning model is trained to correlate the one or more response templates from the corpus of response templates with a content of the at least one historical user message sent by the one or more users prior to a sending of the corresponding at least one agent message.

In at least one embodiment, user feedback regarding the automatically generated at least one response, may be employed to update the at least one machine learning model.

The particular processing operations and other network functionality described in conjunction with the pseudo code of FIG. 3 and the flow diagram of FIG. 5 are presented by way of illustrative example only, and should not be construed as limiting the scope of the disclosure in any way. Alternative embodiments can use other types of processing operations for machine learning-based prediction of message responses using a corpus of response templates. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for machine learning-based prediction of message responses using a corpus of response templates provide a solution that may be integrated with existing message platforms (for example, using a pluggable solution for a representational state transfer (REST) application programming interface), such as the existing messaging platform provided by Salesforce.com, Inc. For example, as noted above, chat messages within an existing message platform can be intercepted and provided to the agent response prediction server 110 of FIG. 1 to predict one or more customer service agent responses. The interface provided by the existing message platform to a customer service agent may be modified to present the predicted agent responses (e.g., a configurable and/or learned number of alternative response options) to the customer service agent, for example, ranked by a confidence score, with any placeholder fields automatically populated. The alternative response options may be displayed to a customer service agent, for example, in the form of one button for each alternative response option, sorted by relevance (e.g., using the confidence score of the prediction) from left to right (left being the most relevant), for example.

In some embodiments, a customer service agent can select any of the buttons to insert the content associated with the alternative response option in the chat message composition portion of the user interface. The customer service agent can then send, modify, delete and/or typeover the inserted content, as required or desired. In addition, the customer service agent may include additional text or completely ignore the prediction and manually type a full response (e.g., by not selecting one of the populated predicted response buttons). As noted above, if a response template associated with a given button has any placeholders, the placeholders may be automatically populated with the appropriate values, such as customer name or case number. If a button has one or more external placeholders (such as an order status or the balance of a customer's account), this information can be obtained by querying a source application using application programming interface calls and then populated into the appropriate placeholder.

As new user messages arrive in a given chat session, the most recent user messages (e.g., since an agent response) can be stacked and the response prediction workflow can be re-executed with the accumulated user messages to increase an accuracy of the prediction since more contextual information is available. Once the customer service agent sends a response, then the buttons presented to the customer service agent based on the prediction may be collapsed to save space in the user interface (although the buttons may remain accessible by expanding the buttons).

One or more embodiments of the disclosure provide improved methods, apparatus and computer program products for machine learning-based prediction of message responses using a corpus of response templates. Among other benefits, the disclosed machine learning-based response prediction techniques assist a customer service agent to understand what the user is looking for and makes it more efficient (e.g., easier and/or faster) for the customer service agent to respond to the user. Rather than selecting only one response, in some embodiments, applicable response templates are evaluated and sorted by relevance (e.g., using the confidence score assigned by the trained machine learning model 250). In this manner, the customer service agent is presented with multiple alternative responses and selects one or more predicted response templates to form a response.

The foregoing applications and associated embodiments should be considered as illustrative only, and numerous other embodiments can be configured using the techniques disclosed herein, in a wide variety of different applications.

It should also be understood that the disclosed techniques for machine learning-based response prediction, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for machine learning-based prediction of message responses using a corpus of response templates may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform as a service (PaaS) model, an Infrastructure as a service (IaaS) model, a Storage-as-a-Service (STaaS) model and/or a Function-as-a-Service (FaaS) model, although numerous alternative arrangements are possible. Also, illustrative embodiments can be implemented outside of the cloud infrastructure context, as in the case of a stand-alone computing and storage system implemented within a given enterprise.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based machine learning-based response prediction engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based machine learning-based response prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
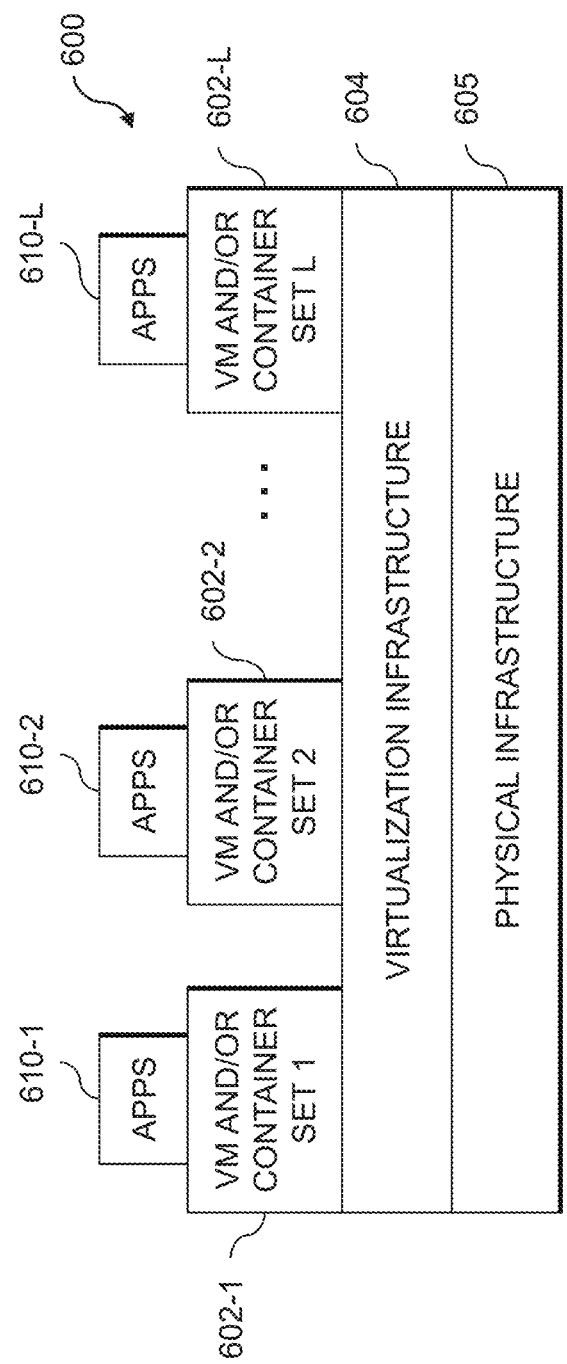
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-R implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-R running on respective ones of the VMs/container sets 602-1, 602-2, . . . 602-R under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide machine learning-based response prediction functionality of the type described above for one or more processes running on a given one of the VMs. For example, each of the VMs can implement machine learning-based response prediction control logic and associated functionality for improving customer service agent efficiency for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide machine learning-based response prediction functionality of the type described above for one or more processes running on different ones of the containers. For example, a container host device supporting multiple containers of one or more container sets can implement one or more instances of machine learning-based response prediction control logic and associated functionality for improving customer service agent efficiency.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
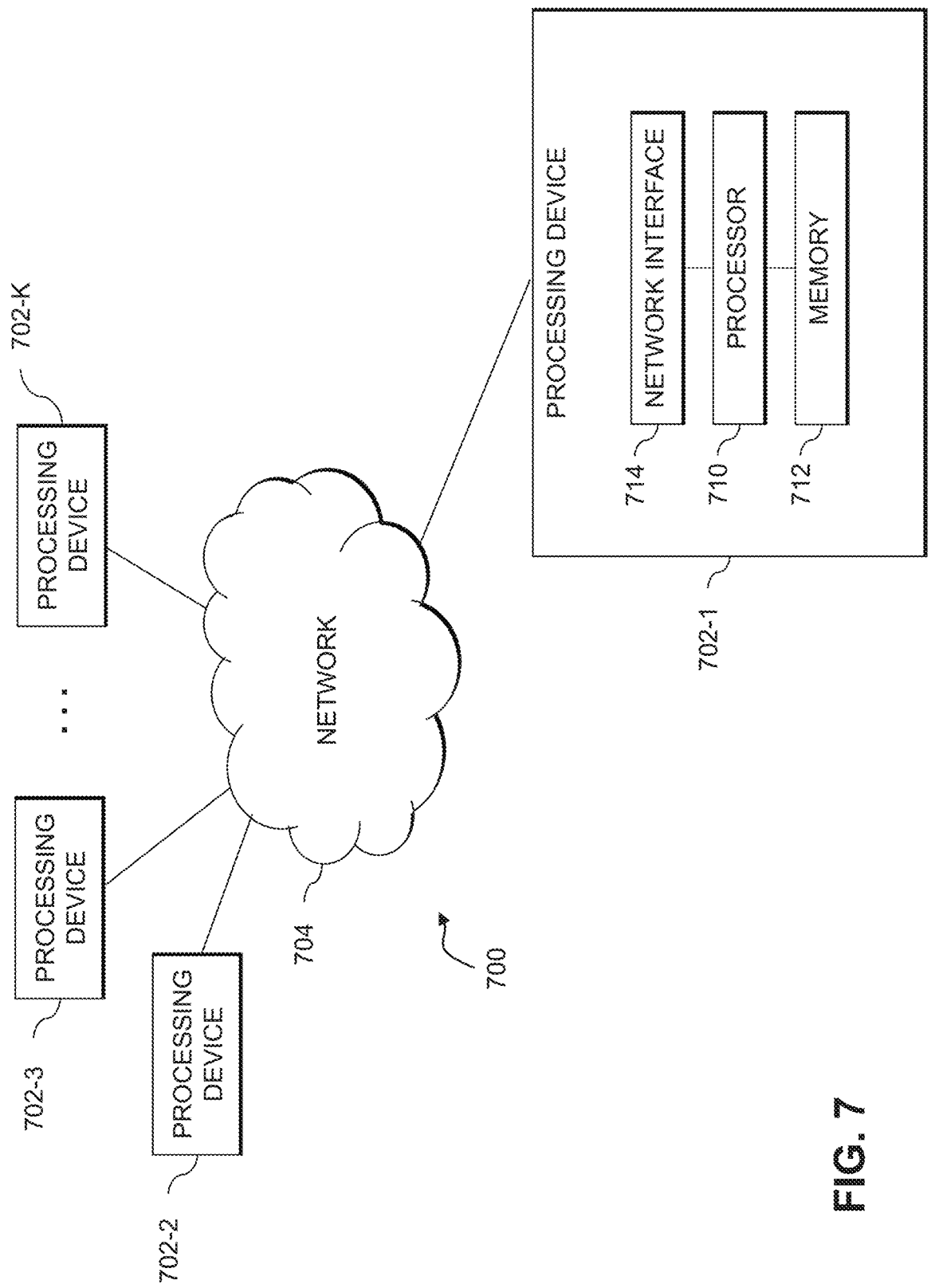
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining at least one user message sent by at least one user;

applying the at least one user message of the at least one user to at least one machine learning model that predicts one or more response templates, from a corpus of response templates, that are responsive to the at least one user message, wherein the at least one machine learning model is trained using training data comprising at least one historical user message sent by one or more users and at least one historical agent message sent by at least one customer service agent, wherein the at least one historical agent message: (i) has a similarity score with respect to at least one of the response templates, from the corpus of response templates, that satisfies one or more similarity criteria, (ii) is sent in response to the at least one historical user message sent by the one or more users; and (iii) is based at least in part on one or more of the at least one response template from the corpus of response templates, wherein an identifier of the at least one response template is used as a classification label in a supervised learning of the at least one machine learning model and wherein the at least one response template and one or more respective variations, that satisfy the one or more similarity criteria, of the at least one response template are considered together during the training of the at least one machine learning model; and automatically generating at least one response to the at least one user message using the predicted one or more response templates;

wherein the method is performed by at least one processing device comprising a processor coupled to a memory.

2. The method of claim 1, wherein the at least one machine learning model predicts a plurality of the response templates that are responsive to the at least one user message and wherein the plurality of response templates are sorted using a corresponding confidence score associated with the prediction of each of the plurality of the response templates.

3. The method of claim 2, further comprising presenting at least a subset of the plurality of the response templates that are responsive to the at least one user message to the at least one customer service agent, using a graphical user interface, for a selection by the at least one customer service agent to prepare at least one response to the at least one user message.

4. The method of claim 2, wherein a number of the plurality of response templates that are presented to the at least one customer service agent is selected based at least in part on an accuracy of the trained machine learning model determined during a testing phase of the at least one machine learning model.

5. The method of claim 2, wherein the corresponding confidence score is determined within a context of a larger communication comprising the at least one user message.

6. The method of claim 1, wherein the at least one machine learning model is trained to correlate the one or more response templates from the corpus of response templates with a content of the at least one historical user message sent by the one or more users prior to a sending of the corresponding at least one historical agent message.

7. The method of claim 1, further comprising employing user feedback regarding the automatically generated at least one response to update the at least one machine learning model.

8. The method of claim 1, wherein the at least one user message is part of a live chat communication between the at least one user and the at least one customer service agent.

9. An apparatus comprising:
at least one processing device comprising a processor coupled to a memory;
the at least one processing device being configured to implement the following steps:
obtaining at least one user message sent by at least one user;
applying the at least one user message of the at least one user to at least one machine learning model that predicts one or more response templates, from a corpus of response templates, that are responsive to the at least one user message, wherein the at least one machine learning model is trained using training data comprising at least one historical user message sent by one or more users and at least one historical agent message sent by at least one customer service agent, wherein the at least one historical agent message: (i) has a similarity score with respect to at least one of the response templates, from the corpus of response templates, that satisfies one or more similarity criteria, (ii) is sent in response to the at least one historical user message sent by the one or more users; and (iii) is based at least in part on one or more of the at least one response template from the corpus of response templates, wherein an identifier of the at least one response template is used as a classification label in a supervised learning of the at least one machine learning model and wherein the at least one response template and one or more respective variations, that satisfy the one or more similarity criteria, of the at least one response template are considered together during the training of the at least one machine learning model; and
automatically generating at least one response to the at least one user message using the predicted one or more response templates.

10. The apparatus of claim 9, wherein the at least one machine learning model predicts a plurality of the response templates that are responsive to the at least one user message and wherein the plurality of response templates are sorted using a corresponding confidence score associated with the prediction of each of the plurality of the response templates.

11. The apparatus of claim 10, further comprising presenting at least a subset of the plurality of the response templates that are responsive to the at least one user message to the at least one customer service agent, using a graphical user interface, for a selection by the at least one customer service agent to prepare at least one response to the at least one user message.

12. The apparatus of claim 10, wherein the corresponding confidence score is determined within a context of a larger communication comprising the at least one user message.

13. The apparatus of claim 9, wherein the at least one machine learning model is trained to correlate the one or more response templates from the corpus of response templates with a content of the at least one historical user message sent by the one or more users prior to a sending of the corresponding at least one historical agent message.

14. The apparatus of claim 9, further comprising employing user feedback regarding the automatically generated at least one response to update the at least one machine learning model.

15. A non-transitory processor-readable storage medium having stored therein program code of one or more software programs, wherein the program code when executed by at least one processing device causes the at least one processing device to perform the following steps:
obtaining at least one user message sent by at least one user;
applying the at least one user message of the at least one user to at least one machine learning model that predicts one or more response templates, from a corpus of response templates, that are responsive to the at least one user message, wherein the at least one machine learning model is trained using training data comprising at least one historical user message sent by one or more users and at least one historical agent message sent by at least one customer service agent, wherein the at least one historical agent message: (i) has a similarity score with respect to at least one of the response templates, from the corpus of response templates, that satisfies one or more similarity criteria, (ii) is sent in response to the at least one historical user message sent by the one or more users; and (iii) is based at least in part on one or more of the at least one response template from the corpus of response templates, wherein an identifier of the at least one response template is used as a classification label in a supervised learning of the at least one machine learning model and wherein the at least one response template and one or more respective variations, that satisfy the one or more similarity criteria, of the at least one response template are considered together during the training of the at least one machine learning model; and
automatically generating at least one response to the at least one user message using the predicted one or more response templates.

16. The non-transitory processor-readable storage medium of claim 15, wherein the at least one machine learning model predicts a plurality of the response templates that are responsive to the at least one user message and wherein the plurality of response templates are sorted using a corresponding confidence score associated with the prediction of each of the plurality of the response templates.

17. The non-transitory processor-readable storage medium of claim 16, further comprising presenting at least a subset of the plurality of the response templates that are responsive to the at least one user message to the at least one customer service agent, using a graphical user interface, for a selection by the at least one customer service agent to prepare at least one response to the at least one user message.

18. The non-transitory processor-readable storage medium of claim 16, wherein the corresponding confidence score is determined within a context of a larger communication comprising the at least one user message.

19. The non-transitory processor-readable storage medium of claim 15, wherein the at least one machine learning model is trained to correlate the one or more response templates from the corpus of response templates with a content of the at least one historical user message sent by the one or more users prior to a sending of the corresponding at least one historical agent message.

20. The non-transitory processor-readable storage medium of claim 15, further comprising employing user feedback regarding the automatically generated at least one response to update the at least one machine learning model.

* * * * *